Dec. 27, 1955  A. A. BRANT  2,728,405
SEISMIC METHOD OF GEOPHYSICAL EXPLORATION
Filed May 26, 1953  2 Sheets-Sheet 1
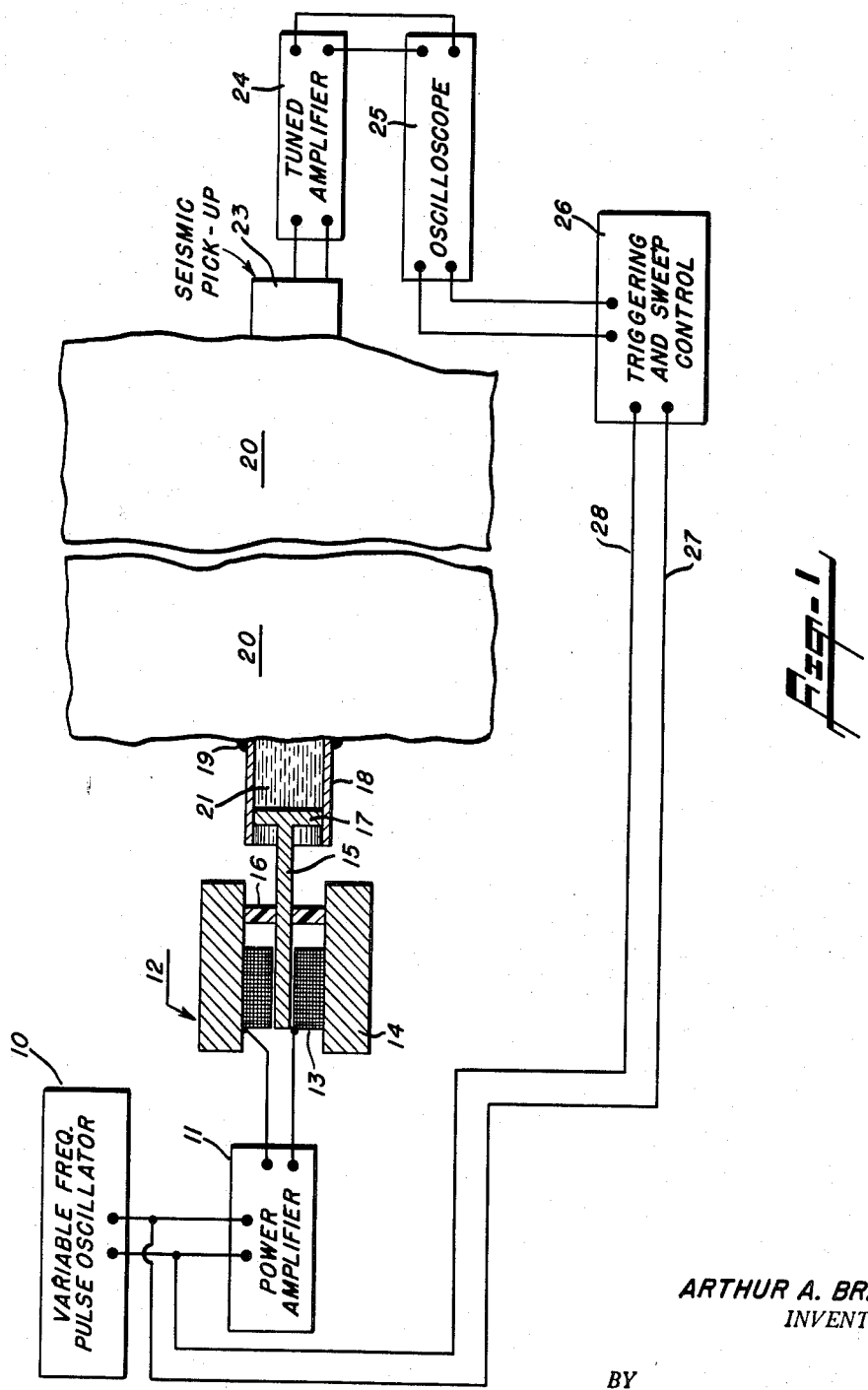
ARTHUR A. BRANT
INVENTOR.

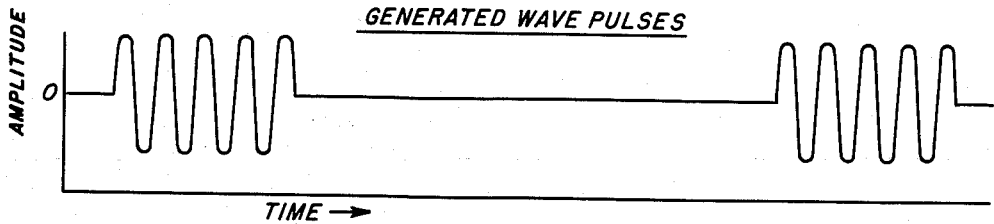
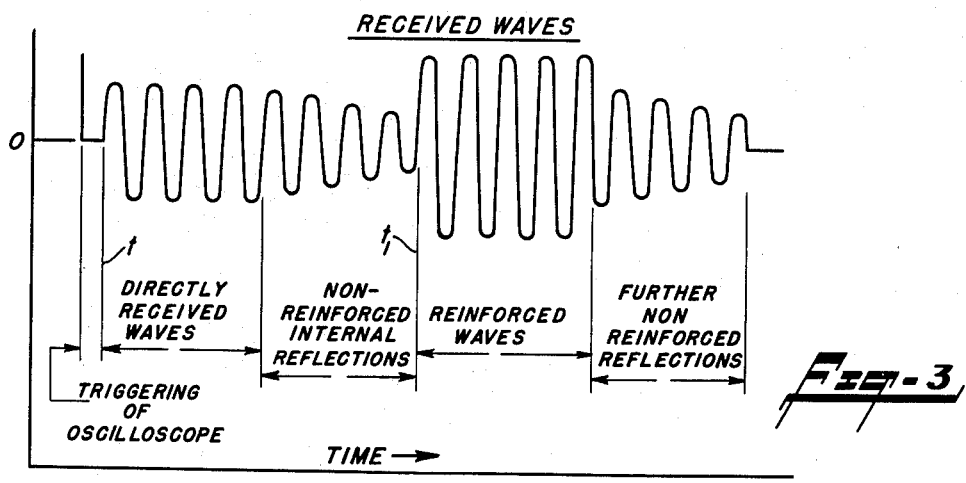
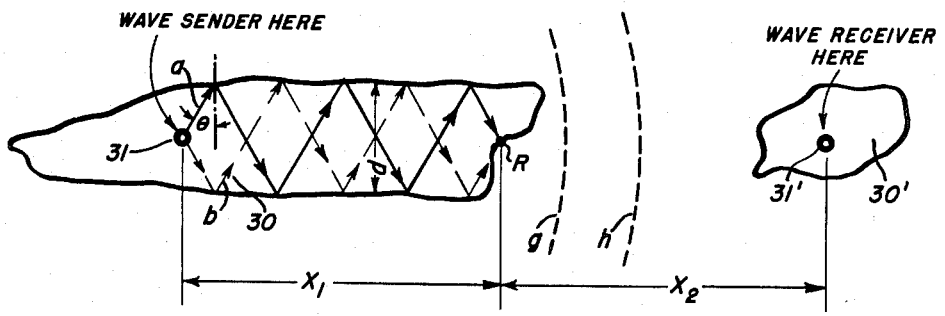

United States Patent Office 2,728,405
Patented Dec. 27, 1955

2,728,405

SEISMIC METHOD OF GEOPHYSICAL EXPLORATION

Arthur A. Brant, Clarkdale, Ariz., assignor to Newmont Mining Corporation, New York, N. Y., a corporation of Delaware Application May 26, 1953, Serial No. 357,562

3 Claims. (Cl. 181—.5)

This invention relates to geophysical exploration and more particularly to a novel method for determining whether or not a sub-surface ore occurrence is continuous between two known points of ore occurrence and/or the extent of a continuous ore zone from a given point of reference.

In mining development and exploration operations it is important to know the extent of the ore-bearing body in order to determine whether or not actual mining operations are warranted. It is, therefore, a broad object of this invention to provide a simple method and procedure for determining whether or not two, spaced points of ore occurrence are actually interconnected by ore-bearing material.

Various methods and means have been proposed for this purpose and my United States Patent Number 2,599,688, issued June 10, 1952, discloses a resistivity method for determining such ore continuity.

A more specific object of this invention is the provision of a seismic method for determining the continuity of a sub-surface ore body.

A further more specific object of this invention is the provision of a method for determining the extent of an ore occurrence by observing the travel times and frequencies at which reinforced wave energy, of controlled frequency, is received at one point of ore occurrence spaced a known distance from another point of ore occurrence.

An object of this invention is the provision of an arrangement for use in determining whether or not a sub-surface ore body is continuous between two known points of ore occurrence said arrangement comprising a variable frequency power generator capable of generating electrical wave pulses, means converting the electrical wave pulses into mechanical vibrations, means coupling the mechanical vibrations to one of the points of ore occurrences, tuned means coupled to the other point of ore occurrence for translation of the received mechanical vibrations into electrical waves, said means being tuned to the frequency of the power generator, means responsive to said electrical waves for observing the standing waves transmitted between the two points of ore occurrence, and means for measuring the arrival time of reinforced waves at the second point of occurrence.

These and other objects and advantages will become apparent from the following description when taken with the accompanying drawings wherein:

Figure 1 illustrates an arrangement for the practice of my invention in the field;

Figure 2 is a graph showing the wave pulses generated at one zone of ore occurrence;

Figure 3 is a related graph showing the wave pulses received at another zone of ore occurrence; and Figure 4 is a representation, in plan, showing the application of my method to the general case wherein the ore zone occurrences are separated.

Ore occurrences of the character contemplated by this invention may be divided into three broad categories as follows:

A. A more or less homogeneous, massive sulphide ore body having a velocity for longitudinal and transverse seismic waves of 5,000–6,000 feet per second and a density of 3.5–4 grams per cubic centimeter. Such ore body generally is surrounded by a rock medium having a seismic wave velocity of 10,000–20,000 feet per second and a density of 2.6–2.9 grams per cc. The wave velocity ratio of the medium to the ore body is, therefore, 1.5–3 and the corresponding density ratio is approximately 0.7.

B. A sheared or crushed ore zone of considerable porosity having a seismic wave velocity of 5,000–10,000 feet per second and a density of 2.0–2.5 grams per cc., the specific wave velocity and density depending upon the extent to which the ore zone is saturated with water. Such ore zone, generally, also is surrounded by a rock medium and, consequently, the wave velocity ratio of the medium to the ore zone is approximately 2 and the corresponding density ratio is approximately 1.2.

C. A quartz vein, or silicified zone, of approximately 15,000 feet per second seismic wave velocity and a density of approximately 2.6 grams per cc. Since the wave velocity and density of the vein is comparable to those of the surrounding rock medium this category is not a favorable case for the practice of my invention based in the internal reflection of seismic waves within the vein or quartz body. However, in most cases, the velocity of the seismic waves is greater in the quartz than in the surrounding rock. Consequently, the continuity of the quartz vein can be determined on the basis of the time required for direct energy to pass through a selected portion of the vein, as will be described in detail below.

It may here be pointed out that the practice of my invention necessitates the use of a higher range of wave frequencies than in general seismic practice with an upper limit of approximately 5000 cycles per second at which frequency seismic energy becomes readily scattered at minor fissures, cracks, breaks, etc., and a lower limit of hundreds of cycles per second.

It is known that in shallow, coastal water work, the shallow water layer behaves as a wave guide, or crude organ pipe, and that reinforcement of wave trains reflected from the upper and lower bounding surfaces of the water layer occur for;

$$f = \frac{(2n-1)V}{4d \cos \theta}$$

where:

$f$=the wave frequency in cycles per second,
$V$=the wave velocity in the water layer in feet per second,
$n$=the order of the reinforcement as 1, 2, 3, etc.
$d$=the thickness of the layer in feet, and
$\theta$=the angle of incidence of the internal reflection.

Cos $\theta$ applies as long as $\theta$ is less than $\theta_c$, the critical angle at the water interface. For $\theta$ greater than $\theta_c$ the cos $\theta$ factor is replaced by 1 and we have simply standing waves. This is referred to by Burg, Ewing, Press and Stulken, Geophysics Magazine, vol. XVI, October 1951, page 594.

The same is held to be applicable for the cases (A) and (B), described above, and to be utilizable for establishing the continuity of such zones. In such cases, however, $$f = \frac{nV}{d \cos \theta}$$

as the bounding medium on either side is the same whereas for the water example there is air above and soil or rock below. This formula is derived from the preceding formula. In the preceding case there is a 180 degree phase change at the water-air boundary so only odd reinforcements arise and, hence, the term $2n-1$ appears in the numerator instead of $n$ as in the present case where the exterior boundary surfaces are the same and of higher velocity relative to the internal bed, or ore zone. Also, in the preceding case the water-air surface is a free surface and analogous to that of a bar that is clamped at one end whereby the wave length $$\left(\frac{V}{f}\right)$$

will involve the factor $4d$, whereas in the present case both boundary surfaces are fixed so that the similarity is to a bar that is clamped at both ends and $2d$ instead of $4d$ is involved. If $\cos \theta$ is taken as equal to 1 (as is the case for a simple organ pipe), the wave length $$\lambda = \frac{V}{f} = 4d$$

in the case of the water air boundary for $n=1$ and, similarly;

$$\lambda = \frac{V}{f} = 2d$$

in the present case; these being the simplest fundamental reinforced standing waves.

Suppose we have a sulphide zone 20' wide. The lowest frequency that would be reinforced by internal reflections and give rise to an increased energy response at some internal point along the strike of the body would be:

$$f = \frac{1 \times 6000'}{20} = 300 \text{ cycles per second}$$

The second frequency to be reinforced would be 600 cycles and so on.

The presence of such well defined, reinforced frequencies, for a standing wave system, is evidence in itself of the continuity of the ore zone (in this case sulphides) and can be used to give an average value for the width, or cross dimension, of the zone.

Reference is now made to Figure 1 which illustrates the arrangement for carrying out observations to check the continuity of a sulphide or other ore zone. Electrical energy in the form of pulsed waves are obtained from a variable frequency pulsed oscillator 10 capable of delivering wave pulses within a range of 100–5,000 cycles per second. Such oscillators, having a multivibrator controlling the bias on the oscillator grids to determine the number of waves in a pulse and the number of waves to be suppressed, are well known in the art. For purposes of this invention, it is preferable that the multivibrator be so synchronized that the pulses each include an integral number of waves and that each pulse starts and stops at a zero point on the wave chain. A series of pulses in which the wave trains last 1/100 to 1/10 second and the suppression intervals equal 1/10 to 1 second is satisfactory. The output of the oscillator 10 is amplified by the power amplifier 11 and the amplifier output energizes an electromagnetic vibrator 12 which comprises a toroidal coil 13, secured in relatively fixed position within a suitable frame member 14, and a movable core 15. The core is supported for axial vibration by a rubber damping pad 16 and includes the piston 17 operative within a cylinder 18. Such cylinder has an end cemented to the ore exposure as by the cement 19, the ore zone being identified by the numeral 20, and the cylinder is filled with water 21. It will be understood that the fluid column can be resonated by adjusting the position of the piston 17 thereby altering the axial length of the cylinder. If the ore exposure is developed by a drill hole the assemblage of the electromagnetic vibrator 12 and cylinder 18 is made to conform to the diameter of such drill hole whereby the entire assemblage may be pushed into position by a rodding system. In such case, the mere presence of fluid, i. e. water, in the drill hole assures that the pressure generated by the piston will be transmitted laterally or angularly, as required, by the orientation of the ore body relative to the intersection in the drill hole.

The detecting apparatus comprises a conventional seismic pick-up 23, preferably of the cantilever, crystal type since such device can readily be oriented to receive horizontally-arriving impulses at a vertical, working face of the ore exposure. Further, such device can readily be pushed or lowered into a conventional 1 7/16 inch diameter drill hole, of arbitrary inclination, by a rodding arrangement. The voltage developed across the faces of the crystal are amplified by an amplifier 24, tuned to the wave frequency of the oscillator 10, and the amplifier output is fed to a long-persistence oscilloscope 25. The sweep circuit of the oscilloscope is triggered by the start of the wave train from the pulsed oscillator 10 and the frequency of the sweep is the pulse-recurrence frequency of such wave trains, such operation being provided by a conventional triggering and sweep control 26 which is connected to the output of oscillator 10 by the wires 27, 28.

In the practice of my invention a continuous series of wave pulses is generated by the oscillator 10, each pulse sequence containing a group of waves having a selected frequency, as illustrated in Figure 2. These electrical wave pulses are converted into mechanical energy by the electromagnet-piston arrangement that is mechanically coupled to the ore body. The start of a wave pulse triggers the oscilloscope sweep circuit and the arrival of the mechanical wave train is detected by the seasmic pick-up 23, converted into corresponding electrical wave pulses and impressed on the oscilloscope. In general, the first waves to arrive at the pick-up will be the unreinforced waves coming directly through the surrounding rock medium. If the frequency of the waves generated by the electromagnet 12 is one for which wave reinforcement occurs due to the internal reflections within the ore body 20, such reinforced waves (i. e. waves of greater amplitude) will arrive sometime later at the pick-up 23, as shown in Figure 3. Since the sweep period is known, the arrival time, $t_1$, of such reinforced waves can be read directly from the oscilloscope. The wave frequency of the oscillator 10 can be varied in discrete steps through a series of known frequencies of constant pulse duration, and for constant power output of the generating system, whereby the amplitudes of the received waves can be observed and reduced to a comparable basis. Thus, the frequencies at which wave reinforcement occurs can be determined.

It is contemplated that the distance between the two ore zone occurrences, that is, the distance between wave sending and receiving stations, will seldom exceed 1000 feet and that power attenuation will be small whereby an output of some 1000 watts from the oscillator 10 will suffice to give a $10^4$ microvolt output at the pick-up 23, at 100 cycles per second.

The general case in the field is one where the ore occurrence exposed in the underground opening, or drill hole, is not continuous to, or joined to, the other ore occurrence. However, I have found that as long as the ore zone has a reasonable extent for categories A and B, above, it need not be continuous for the method to be valid and provide a practical determination of the length and width of the ore zone. Thus, in Figure 4, there is a considerable extension of the ore zone 30 toward the other ore zone 30', the latter being assumed to be very local for purposes of simplicity. The wave-sending apparatus is placed in the opening 31, at the ore occurrence 30, and the wave receiving apparatus is placed in the opening 31' at ore occurrence 30'. This case is now analogous to the organ pipe, or wave guide, where the receiver lies beyond the end of the pipe or guide. As long as the length of the ore zone 30 is reasonably greater than its width, reinforcement of certain wave frequencies will take place within the ore zone 30 and these will provide an increased amplitude of response at the receiver positioned in the ore zone 30'. Thus, R is a point on the terminal margin of the body 30 where wave reinforcement, at a given frequency $f$, occurs for the ray paths $a$ and $b$, shown in the drawing. Since the point R becomes a secondary source, wave fronts $g$ and $h$ can be considered as emanating from the point R toward the receiver since no reflection or refraction phenomena occur between such point and the receiver. Transmission for the frequency $f$ is, hence, direct between point R and the receiver positioned at 31'.

Let the distance between the points 31 and R be $X_1$ feet and the distance between R and the point 31' be $X_2$ feet and suppose that an increased amplitude of signal is received at the point 31' for a frequency of $f$. The order of the wave reinforcement within the ore zone 30 and at the point R is not known and can be represented by $n$. The known velocity of compressional waves within the ore zone 30 is V feet per second and in the surrounding rock $V_2$ feet per second.

A ray such as "$a$," Figure 4, which leads to reinforcement at R is internally reflected $m$ times and each time makes an angle $\theta$, as shown, Figure 4, with the perpendicular to the ore body surface. The average breadth of the ore body is taken as $d$ feet.

The frequencies at which reinforcement can occur are given by $$f = \frac{nV}{d \cos \theta}$$

where no phase changes or equal phase changes, occur at the internal reflecting surfaces, i. e., at the sides of the body.

For a given value of $\theta$ we will get little change in arrival time $t_1$, for by varying $n$, we simply vary $f$ through a series of harmonic values.

For a given $n$ however, varying $f$, and the associated wave length ($=V/f$), will vary the travel time $t_1$ marking the arrival of the reinforced waves, as e. g., $t_1$ in Figure 3, and $\theta$ the angle of internal reflection, as e. g., in Figure 4.

Thus for two frequencies which are not harmonics but for which reinforcement occurs $$f_1 = \frac{nV}{d \cos \theta_1}$$

$$f_2 = \frac{nV}{d \cos \theta_2}$$

whence $f_1/f_2 \cos \theta_1 = \cos \theta_2$ \hfill (1)

Also $$t_1 = \frac{md}{V \cos \theta_1} + \frac{X_2}{V_2}$$

where $m$ is the number of internal reflections occurring within the ore or vein zone and $t_1$ is the total travel time between points 31 and 31', Figure 4, at frequency $f_1$.

$$t_2 = \frac{md}{V \cos \theta_2} + \frac{X_2}{V_2}$$

whence $$t_1 - t_2 = \frac{md}{V \cos \theta_1}\left(1 - \frac{f_2}{f_1}\right)$$

and $$\frac{md}{V \cos \theta_1} = \frac{t_1 - t_2}{1 - f_2/f_1} \quad (2)$$

Hence $$t_1 - \frac{t_1 - t_2}{1 - f_2/f_1} = \frac{X_2}{V_2} \quad (3)$$

which immediately gives $X_2$.

Now $X_1$ simply equals $X - X_2$ \hfill (4)

$$\frac{md}{\cos \theta_1}$$

is actually the length of the ray path, for example "$a$" or "$b$," Figure 4, within the ore body, and is readily derivable from (2).

$$\frac{md}{\cos \theta_1} \text{ must equal } \frac{X_1}{\sin \theta_1}$$

which is also the length of the ray path within the body. Hence $$\sin \theta_1 = X_1 \bigg/ \frac{md}{\cos \theta_1} = \frac{X_1}{V} \cdot \frac{1}{\frac{t_1 - t_2}{1 - f_2/f_1}} \text{ giving } \theta_1 \quad (5)$$

Thus $X_1$ the length of the ore zone from 31 toward $31^1$ is directly determinable, see (3) and (4), and is $$X_1 = X - V_2 t_1 + V_2 \left(\frac{t_1 - t_2}{1 - f_2/f_1}\right) \quad (6)$$

where $t_1$ and $t_2$ are the travel times directly read for the arrival of the reinforced waves occurring at the non harmonic frequencies $f_1$ and $f_2$, $f_1$ and $f_2$ being noted by the settings of the valuable frequency pulse oscillator 10 of Figure 1.

Thus $X_1$ is related to directly measurable and observable quantities.

Similarly $\theta_1$ is related to directly measurable quantities.

Substituting in Equation 5 for the value of $X_1$ shown in Equation 6 gives $$\sin \theta_1 = \frac{X - V_2 t_1}{V}\left(\frac{1 - \frac{f_2}{f_1}}{t_1 - t_2} + \frac{V_2}{V}\right)$$

Thus, the value of $\theta_1$ is determined in terms of measurable quantities.

The average thickness of the ore zone $d$ is directly deducible.

$$f_1 = \frac{n_1 V}{d \cos \theta_1} \quad (7)$$

Now vary $f_1$, either increasing or decreasing, until another wave reinforcement occurs at time $t_1$. If this occurs at frequency $f_1'$, then $f_1$ and $f_1'$ are neighboring harmonics and $$f_1/_1' = \frac{n_1}{n_1'}$$

Thus if $f_1'$ is 400 cycles per second and $f_1$ 200 cycles per second $$\frac{n_1}{n_1'} = \frac{1}{2}$$

and $n_1$ likely has the value 1. This can readily be tested by observing if a reinforcement occurs at 100 cycles.

If $f_1' = 300$ cycles per second and $f_1 = 200$ cycles per second $$\frac{n_1}{n_1'} = \frac{2}{3}$$

and $n_1$ is likely 2. Again this can readily be checked by trying 100 cycles or 400 cycles per second.

From the above it will be seen that $n_1$, the order of the reinforcement at frequency $f_1$, can be determined simply by varying the frequency to a second frequency $f_1'$ at which a second reinforcement occurs. The second frequency may or may not be a harmonic; it is merely necessary that it be a second frequency at which reinforcement occurs. In the first example, $f_1'$ is a simple harmonic of $f_1$. In the second example, $f_1'$ is not a simple harmonic of $f_1$, but both $f_1'$ and $f_1$ are harmonics of the same fundamental.

With $n$ known $$d = \frac{nV}{f \cos \theta} \quad (8)$$

where all the quantities are known.

It will now be clear that by using the resonance, or wave reinforcement, phenomenon and observing the travel times and frequencies at which wave reinforcements occur for a series of wave frequencies, we can determine the extent of an ore intersection toward either another point of ore occurrence or toward another point more or less on strike or line of the ore occurrence. Actually, the case of ore continuity between two occurrences is only a special case of the situation treated above.

In the case of category C, above, which is not amenable to the above procedure, we can obtain the required information by observing, on the oscilloscope, the travel times of the direct waves, i. e., the time $t$ shown in Figure 3. If the ore zone has a higher wave velocity than the surrounding rock medium the extent of the ore zone can be derived from the following:

$$t = \frac{X_1}{V_1} + \frac{X_2}{V_2}$$

and $X_1 + X_2 = X$, the known distance between the sending and receiving stations.

Whence $$X_1 = V_1 \frac{X - V_2 t}{V_1 - V_2} \quad (9)$$

$V_1$ and $V_2$ are the known compressional wave velocities in the ore and rock, respectively, as measured by conventional seismic procedures, and $t$ is the time of the first arrival of the direct wave at the receiving station as shown in Figure 3.

Having now described my invention in detail in accordance with the patent statutes that which I desire to protect by Letters Patent of the United States is set forth in the following claims.

I claim:

1. A method for determining the extent of a subsurface ore body between a first point in the ore body and a second point not necessarily in the ore body, said method comprising the steps of applying pulses of mechanical waves at one point of ore occurrence and observing the resulting pulses received at the second point, varying the frequency of the mechanical waves in discrete steps until reinforced wave pulses are received at the said second point, measuring the time required for such pulse to travel from the first point of ore occurrence to the second point and repeating the procedure until another set of reinforced wave pulses are received at the second point, the length, $X_1$, of the ore body in the direction of the second point being determinable from:

$$X_1 = X - V_2 t_1 + V_2 \left( \frac{t_1 - t_2}{1 - \frac{f_2}{f_1}} \right)$$

where:

$X$ = the distance between the two points;

$t_1$ = the measured time required for the first reinforced wave pulse, of frequency $f_1$, to travel from the first point of ore occurrence to the second point;

$t_2$ = the measured time required for the second reinforced wave pulse of frequency $f_2$, where $f_2$ is not a harmonic of $f_1$, to travel from the first point of ore occurrence to the second point; and $V_2$ = the known velocity of compressional waves in the rock medium surrounding the ore body.

2. The method of measuring the extent of a subsurface ore body between a first point in the ore body and a second point not necessarily in the ore body, said method comprising applying pulses of electro-mechanical waves to the ore body at the said first point; varying the frequency of the electro-mechanical waves in discrete steps until a first set of reinforced waves is received at the said second point; measuring the time required for such reinforced pulse to travel between the said two points; repeating the procedure until a second set of reinforced wave pulses is received at the said second point, said second reinforced waves being of a non-harmonic frequency relative to the said first set of waves; and measuring the time required for such second reinforced pulses to travel between the said two points.

3. A method for determining the thickness of a subsurface ore body which method comprises applying pulses of mechanical waves to the ore body at a point of ore occurrence; varying the frequency of the mechanical waves in discrete steps until a first set of reinforced wave pulses is received at a second point spaced from the first said point but not necessarily in the ore body; measuring the time required for the pulses to travel from the first point to the second point; repeating the procedure until a second set of reinforced wave pulses at a non-harmonically related frequency to the first set are received at the second point; and measuring the time required for the second pulses to travel from the first point to the second point; the average thickness, $d$, of the ore body normal to the said two points being determinable from:

$$d = \frac{nV}{f_1 \cos \theta}$$

where;

$n$ = the order of reinforcement as determined from the frequencies for reinforcement at neighboring harmonic frequencies;

$f_1$ = the frequency for which the reinforcement of order $n$ occurs;

$V$ = the known velocity of compressional waves within the ore body; and $\theta$ = the angle of incidence at internal reflection for the ray path of reinforced waves within the ore body as determined from:

$$\sin \theta = \frac{X - V_2 t_1}{V} \left( \frac{1 - \frac{f_2}{f_1}}{t_1 - t_2} \right) + \frac{V_2}{V}$$

where;

$V_2$ = the known velocity of compressional waves within the surrounding rock medium;

$f_2$ = the frequency of the second reinforced wave pulses, and not a harmonic of $f_1$;

$t_1$ = the time required for the reinforced waves of frequency $f_1$ to travel between the two points;

$t_2$ = the time required for the reinforced waves of frequency $f_2$ to travel between the said two points; and $X$ = the distance between the said two points.

References Cited in the file of this patent

UNITED STATES PATENTS

| | | |
|---|---|---|
| 2,235,089 | Sparks | Mar. 18, 1941 |
| 2,364,209 | Green | Dec. 5, 1944 |
| 2,388,703 | Peterson | Nov. 13, 1945 |
| 2,484,623 | Heising | Oct. 11, 1949 |
| 2,514,482 | Farmer | July 11, 1950 |
| 2,521,130 | Scherbatskoy | Sept. 5, 1950 |